United States Patent Office 3,278,595
Patented Oct. 11, 1966

---

3,278,595
PREPARATION AND RECOVERY OF N,N'-DIFLUORO-UREA
David F. Sheehan, Woodland Hills, Michael G. Warner, Canoga Park, and Emil A. Lawton, Woodland Hills, Calif., assignors to North American Aviation, Inc.
No Drawing. Filed Apr. 17, 1961, Ser. No. 103,255
4 Claims. (Cl. 260—553)

This invention relates to a novel process for the preparation of compounds having nitrogen-to-fluorine bonds. In particular, this invention is concerned with a process for obtaining N,N-difluorourea. It has been discovered that high yields of N,N-difluorourea may be recovered from the reaction product of fluorine and nitrogen compounds containing amide and imide linkages.

It is, therefore, an object of this invention to provide a process for the preparation of N,N-difluorourea. A further object is to provide a process for the recovery of high yields of N,N-difluorourea from the reaction product of fluorine and an amide or imide. A still further object is to provide a process for the preparation of N,N-difluorourea which does not require direct distillation of the original reaction mixture.

The above and other objects of this invention will be accomplished by a process which comprises fluorinating a nitrogen compound containing amide or imide linkages with a gaseous fluorine source and subsequently extracting the resulting reaction product with a solvent selected from the class consisting of alkyl ethers, cyclic ethers and partially halogenated liquid hydrocarbons.

The reaction is conducted by passing fluorine gas through the nitrogen compound. The temperature of the reaction varies between −65° C. and +65° C. The preferred temperature range for conducting the reaction is between −30° C. and +30° C., however, the particularly preferred reaction temperature is 0° C., as, at this temperature, the reaction proceeds in a satisfactory rate with a minimum of undesirable side reaction.

Since the reaction is extremely exothermic, the flow rate of fluorine through the nitrogen-containing compound must be adjusted so that the reaction temperature can be maintained. The precise flow rate depends upon the size of the reactor, the surface of the nitrogen compound contacted, and the efficiency of heat transfer to the cooling medium employed to maintain the reaction temperature. In order to prevent a too concentrated reaction from occurring, it is preferred to carry the fluorine gas into the reaction mixture with a suitable diluent gas. For this purpose nitrogen is preferred, however, the other inert gases may be employed. The process is more fully described in application, Serial No. 840,066, filed by E. A. Lawton et al. on September 15, 1959, and in a further application Serial No. 103,512 filed by E. A. Lawton et al. concurrently with the present specification, and entitled, "Flourine Containing Organic Compound."

The preferred nitrogen-containing reactant in the process of this invention is urea since it has been found that high yields of N,N-difluorourea are obtained by reacting urea with fluorine and extracting the reaction product in accordance with this invention.

The partially halogenated hydrocarbon solvent used to extract the N,N-difluorourea from the reaction product has, in general, from 1 to 5 carbon atoms and is preferably a halogenated alkane with a boiling point below about 120° C. and above −60° C. These partially halogenated alkane compounds include methylchloride, methylbromide, dichloromethane, dibromomethane, difluoromethane, chloroform, ethylbromide, ethylchloride, ethyliodide, 1,1-dichloroethane, 1,1-difluoroethane, 2-bromopropane, 2-chloropropane, 1-chloro-2-methylbutane, tert-amylfluoride, 1-fluorobutane, 1-chlorobutane, 2-chlorobutane, 2-chloro-2-methylpropane, and the like. Since many of these solvents have boiling points below ordinary ambient temperatures, it is often necessary to conduct the extraction at reduced temperatures. Dichloromethane is a preferred solvent and since it has a boiling point of over 40° C., the extraction can be carried out at ordinary ambient temperatures. Further, N,N-difluorourea is extremely soluble in dichloromethane.

The cyclic ethers applicable to the process of this invention are cyclic compounds having 5- or 6-ring atoms including one or more oxygen atoms, the remainder being carbon atoms, thus, tetrahydrofuran, tetrahydropyran, m-dioxane, p-dioxane, and the like may be employed in the process of this invention. A preferred solvent of the cyclic ether type is tetrahydrofuran, as it has been found that N,N-difluorourea is also extremely soluble in this compound.

The alkyl ethers applicable to the process of this invention are lower alkyl ethers which, in general, have up to about 8 carbon atoms in the molecule. They have the formula R—O—', where R and R' are alkyl hydrocarbon groups having from 1 to 7 carbon atoms. The preferred ethers are those having from 4 to 6 carbon atoms and diethyl ether is the most particularly preferred solvent in this class. Other examples of alkyl ethers applicable to this invention are dimethyl ether, ethylmethyl ether, di-n-propyl ether, and dibutyl ether.

In general, the greatest quantity of N,N-difluorourea may be extracted from the reaction mixture or residue with from 1 to 15 volumes of halogenated hydrocarbon or cyclic ether. For most efficient operation of the process multiple extractions are preferred. The extractions are then combined and the solvent removed by evaporation. Alternatively, it is possible to recover N,N-difluorourea from the solvent by crystallization or a combination of evaporation and crystallization. In certain instances, the N,N-difluorourea may be used in further chemical processing without removing it from the solvent.

The following examples illustrate the preparation of N,N-difluorourea by the process of this invention.

*Example 1*

In a reaction vessel equipped with cooling means, means for admitting and discharging gases and solid reactants and passing the gaseous reactants through the solids is placed 900 parts of urea. The vessel is immersed in a coooling bath at 0° C. and flushed with nitrogen. When free of contained oxygen, 359 parts of fluorine gas are admitted to the vessel in conjunction with a nitrogen diluent. The fluorine is admitted to the reaction vessel over a four-hour period. Gaseous products and unreacted fluorine are passed through a series of hydrogen fluoride absorbers and cold traps to prevent reactive fluorine from passing to the atmosphere.

When the reaction is complete, the reaction mixture in the vessel is warmed to ambient temperature at pressures under 2 mm. of mercury and the liquid residue extracted three times with four times its volume of dichloromethane. The extracts are then combined and evaporated to yield a solid which is purified by sublimation to form long, thin needles of difluorourea melting at 41 to 41.5° C.

The infrared spectra of $F_2NCONH_2$ were determined in dichloromethane solution using dichloromethane as a reference, and in a solid mineral oil mull. The structure was proved as follows:

(1) Medium intensity absorptions in dilute solution at 3520 and 3420 cm.$^{-1}$ correspond to the NH stretch of a primary amide. In the solid these absorptions are shifted to lower frequencies, 3425 and 3320 cm.$^{-1}$, respectively, which is expected for association of a primary amide.

(2) In dilute solution, a strong band is found at 1803 cm.$^{-1}$ corresponding to a carbonyl absorption with a strong electro-negative group in the position. In the solid state, this absorption shifts to a lower frequency, 1790 cm.$^{-1}$. The direction of the shift is as expected for such a structure.

(3) In dilute solution, a strong band at 1592 cm.$^{-1}$ corresponds to the Amide II absorption of a primary amide. In the solid state, this absorption is shifted to a higher frequency, 1613 cm.$^{-1}$; the direction of the shift is as expected.

(4) The frequency shifts of the 1803 cm.$^{-1}$ and 1592 cm.$^{-1}$ absorptions which occur on comparison of the spectrum of a dilute solution of the compound with its spectrum in the solid state confirms the assignments of the Amide I and Amide III Bands of a primary amide, respectively, to these absorptions.

(5) There is a large frequency shift of the Amide I Band from a nominal 1690 cm.$^{-1}$ in dilute solution to 1803 cm.$^{-1}$. A strong absorption at 925 cm.$^{-1}$ has been assigned to the N–F stretch and is compatible with the remainder of the spectrum.

The N,N-difluorourea was also subjected to chemical analysis and found to contain 38.6% fluorine, 29.3% nitrogen, and 14.6% amino nitrogen ($NH_2$). The calculated analysis for N,N-difluorourea is 39.6% fluorine 29.2% nitrogen, with 14.6% amino nitrogen.

These data unambiguously identify the compound as unsymmetrical difluorourea, $F_2NCONH_2$.

*Example 2*

The N,N-difluorourea prepared by the process of this invention is useful in the preparation of difluoramine. To illustrate this utility, about 200 parts of crude difluorourea, prepared as in Example 1, are dissolved in 6000 parts of $CH_2Cl_2$. The solution is charged to a heating vessel fitted with a water-cooled condenser and a $-142°$ C. U-trap in series. Gaseous products which pass through the water condenser are collected as liquids in the cold trap at $-142°$ C. The system is then flushed with dry nitrogen gas and heated in reflux. The unsymmetrical difluorourea decomposes upon heating. These condensed gases are fractionated through $-95$ and $-126°$ C. fractions. $HNF_2$ is isolated in the product in good yield and identified by its I.R. spectrum.

N,N-difluorourea, in addition to being an intermediate in the preparation of difluoramine, is a monopropellant and oxidizing agent. When employed as a monopropellant, the compound decomposes stoichiometrically to form completely gaseous products. As illustrated by Example 2, the compound is a valuable source of difluoramine. Isocyanic acid is also produced in this decomposition.

Since N,N-difluorourea decomposes on contact with moist air at elevated temperatures, it is often desirable to store and use the compound in solution. Thus, difluoramine may be prepared from N,N-difluorourea while it is contained in the solvent. Further, the compound may be used as an oxidizing agent in solution. Ordinarily, to employ the compound the solution should contain at least one percent of the compound and compositions containing 10 to 15 percent, or more, may be employed. In fact, saturated solutions of the compound may also be used.

Although the invention has been described in detail, it is to be clearly understood that the same is by way of illustration and example only, and is not to be taken by way of limitation, the spirit and scope of this invention being limited only by the terms of the appended claims.

We claim:

1. In a process for preparing N,N-difluorourea by reacting fluorine with urea thus forming a reaction mixture containing N,N-difluorourea and separating said N,N-difluorourea from the reaction mixture, the improvement which comprises extracting said reaction mixture with a solvent selected from the class consisting of cyclic ethers containing from 5 to 6 ring atoms, said ring atoms consisting of carbon and oxygen wherein at least one of said ring atoms is oxygen and partially halogenated alkane hydrocarbons having from 1 to about 5 carbon atoms and subsequently evaporating said solvent to recover N,N-difluorourea.

2. The process for preparing N,N-difluorourea which comprises reacting urea with fluorine at a temperature of from $-30°$ C. to about $+30°$ C., extracting the resulting reaction mixture with a solvent selected from the class consisting of cyclic ethers containing from 5 to 6 ring atoms consisting of carbon and oxygen wherein at least one of said ring atoms is oxygen and partially halogenated aklane hydrocarbons having from 1 to about 5 carbon atoms, separating said extract and solvent from said reaction mixture, evaporating said solvent and purifying the resulting N,N-difluorourea by sublimation.

3. The process of claim 2, wherein said temperature is 0° C.

4. The process of claim 3, wherein said solvent is a partially halogenated alkane hydrocarbon having from 1 to about 5 carbon atoms.

No references cited.

ALEX MAZEL, *Primary Examiner.*

IRVING MARCUS, CARL D. QUARFORTH, O. R. VERTIZ, *Examiners.*

H. R. JILES, J. W. WHISLER, L. A. SEBASTIAN,
*Assistant Examiners.*